US012638749B2

(12) United States Patent
Kojima et al.

(10) Patent No.: US 12,638,749 B2
(45) Date of Patent: May 26, 2026

(54) ELECTRONIC APPARATUS AND IMAGING DEVICE

(71) Applicant: CANON KABUSHIKI KAISHA, Tokyo (JP)

(72) Inventors: Yutaka Kojima, Kanagawa (JP); Genki Tanaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 238 days.

(21) Appl. No.: 18/632,109

(22) Filed: Apr. 10, 2024

(65) Prior Publication Data

US 2024/0255831 A1 Aug. 1, 2024

Related U.S. Application Data

(63) Continuation-in-part of application No. PCT/JP2022/033555, filed on Sep. 7, 2022.

(30) Foreign Application Priority Data

Oct. 14, 2021 (JP) ................................ 2021-168726
Aug. 4, 2022 (JP) ................................ 2022-124997

(51) Int. Cl.
G03B 13/06 (2021.01)
G03B 17/02 (2021.01)
H04N 23/611 (2023.01)
(52) U.S. Cl.
CPC ............. *G03B 13/06* (2013.01); *G03B 17/02* (2013.01); *H04N 23/611* (2023.01)

(58) Field of Classification Search
CPC ................ H04N 23/611; H04N 23/561; G06F 3/012–013; G03B 13/00–36
See application file for complete search history.

(56) References Cited

U.S. PATENT DOCUMENTS

| | | | | | |
|---|---|---|---|---|---|
| 5,905,380 | A | * | 5/1999 | Weiner ................... | G01V 8/005 |
| | | | | | 324/637 |
| 8,605,188 | B2 | * | 12/2013 | Ishihara ................. | G03B 13/36 |
| | | | | | 348/333.01 |
| 8,692,921 | B2 | * | 4/2014 | Nakagawa ........... | H04N 23/531 |
| | | | | | 348/333.06 |

(Continued)

FOREIGN PATENT DOCUMENTS

| | | |
|---|---|---|
| JP | 2001186384 A | 7/2001 |
| JP | 2011047933 A | 3/2011 |

(Continued)

*Primary Examiner* — Leon W Rhodes, Jr.
(74) *Attorney, Agent, or Firm* — Canon U.S.A., Inc. IP Division

(57) ABSTRACT

A layout of a detection unit is provided in an electronic apparatus including the detection unit with which functions of a plurality of sensing devices can be replaced. An electronic apparatus includes a movable member movable with respect to a main body of the electronic apparatus, an eyepiece portion, and a detection unit configured to simultaneously detect an attitude of the movable member and eye contact with the eyepiece portion by radiating radio waves. The detection unit is arranged at a position and an attitude based on an orientation angle, arrangement information of the movable member, an amount of detection of the movable member for detecting the attitude, and information about an eye point related to the eyepiece portion.

12 Claims, 10 Drawing Sheets

(56) References Cited

U.S. PATENT DOCUMENTS

| | | | | |
|---|---|---|---|---|
| 9,323,061 | B2 * | 4/2016 | Edwards | ............ G02B 27/0172 |
| 10,257,425 | B2 * | 4/2019 | Nakagawara | .......... H04N 23/63 |

FOREIGN PATENT DOCUMENTS

| | | | |
|---|---|---|---|
| JP | 2018022115 | A | 2/2018 |
| JP | 2020010117 | A | 1/2020 |
| JP | 2021170699 | A | 10/2021 |

* cited by examiner

ELECTRONIC APPARATUS AND IMAGING DEVICE

CROSS REFERENCE OF RELATED APPLICATIONS

This application is a Continuation In Part of International Patent Application No. PCT/JP2022/033555, filed Sep. 7, 2022, which claims the benefit of priority from Japanese Patent Application No. 2021-168726, filed on Oct. 14, 2021, and 2022-124997, filed on Aug. 4, 2022, all of which are hereby incorporated by reference herein in their entirety.

BACKGROUND

Field

The present disclosure relates to an electronic apparatus and an imaging device.

Description of the Related Art

A radar device, capable of discriminating a target object and detecting a distance to the target object according to a result of radiating radio waves with a specific wavelength, has been developed and is being considered for application to autonomous driving of automobiles, gesture manipulations of smartphones, and the like.

Because radar devices are less susceptible to noise and have high radio wave transparency, there is a high degree of freedom in an arrangement within an apparatus. Japanese Patent Laid-Open No. 2011-47933 discloses a stereoscopic detection system equipped with a sensing device (camera sensor) capable of detecting a physical object at a short distance and with a radar device capable of detecting a physical object at a long distance.

In some electronic apparatuses including an imaging device, a radar device is installed in addition to the existing sensing device, and therefore it is possible to discriminate various user states such as a position of a user for the apparatus and whether or not the user is present in a device detection region.

On the other hand, conventional electronic apparatuses are equipped with a plurality of sensing devices for performing state detection such as eye contact detection for an eyepiece portion and detection of an open or closed state of a movable rear liquid crystal panel. Because the installation of the plurality of sensing devices is a factor in increasing costs, there is a need to reduce the number of sensing devices installed in the electronic apparatuses.

SUMMARY OF THE DISCLOSURE

According to an embodiment of the present disclosure, there is provided an electronic apparatus including: a movable member movable with respect to a main body of the electronic apparatus; an eyepiece portion; a detection unit configured to simultaneously detect an attitude of the movable member and eye contact with the eyepiece portion. The detection unit is arranged at a position and an attitude based on an orientation angle of the detection unit, arrangement information of the movable member, information of a region of the movable member interfering with the radio waves for detecting the attitude, and information about an eye point related to the eyepiece portion.

Further features of the present disclosure will become apparent from the following description of embodiments with reference to the attached drawings.

BRIEF DESCRIPTION OF THE DRAWINGS

FIG. 10A and FIG. 10B are diagrams showing positional relationships of the millimeter-wave radar device, a radio antenna module, and a sheet metal that fixes them.

DESCRIPTION OF THE EMBODIMENTS

Embodiment 1

Figure 1:
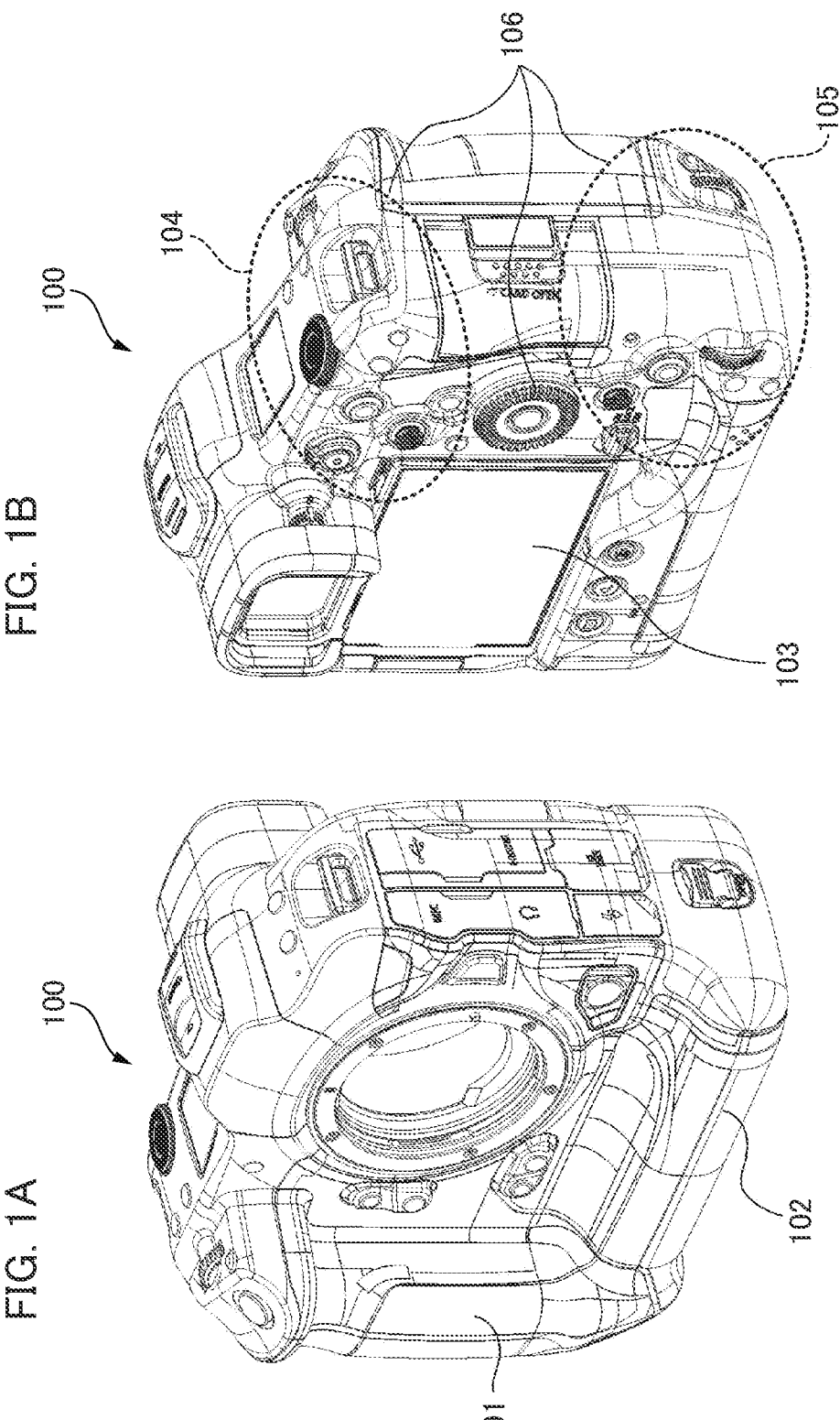
FIG. 1A and FIG. 1B are diagrams showing an exterior of an electronic apparatus of the present embodiment.

FIG. 1A and FIG. 1B are diagrams showing an exterior of an electronic apparatus of the present embodiment. In FIG. 1A and FIG. 1B, an imaging device will be described as an example of the electronic apparatus. In addition, the scope of application of the present disclosure is not limited to the imaging device. The present disclosure can be applied to any electronic apparatus such as a smartphone, a tablet terminal, or a portable game machine in addition to the imaging device.

FIG. 1A shows the exterior of the imaging device when viewed from a subject side. FIG. 1B shows the exterior of the imaging device when viewed from the rear. The imaging device 100 has a housing shape in which a normal position gripping portion 101 and a vertical position gripping portion 102 are integrated.

The normal position gripping portion 101 is used for a user to grip the imaging device 100 in a state in which the imaging device 100 is at a normal position. The vertical position gripping portion 102 is used for the user to grip the imaging device 100 in a state in which the imaging device 100 is at a vertical position.

Figure 3:
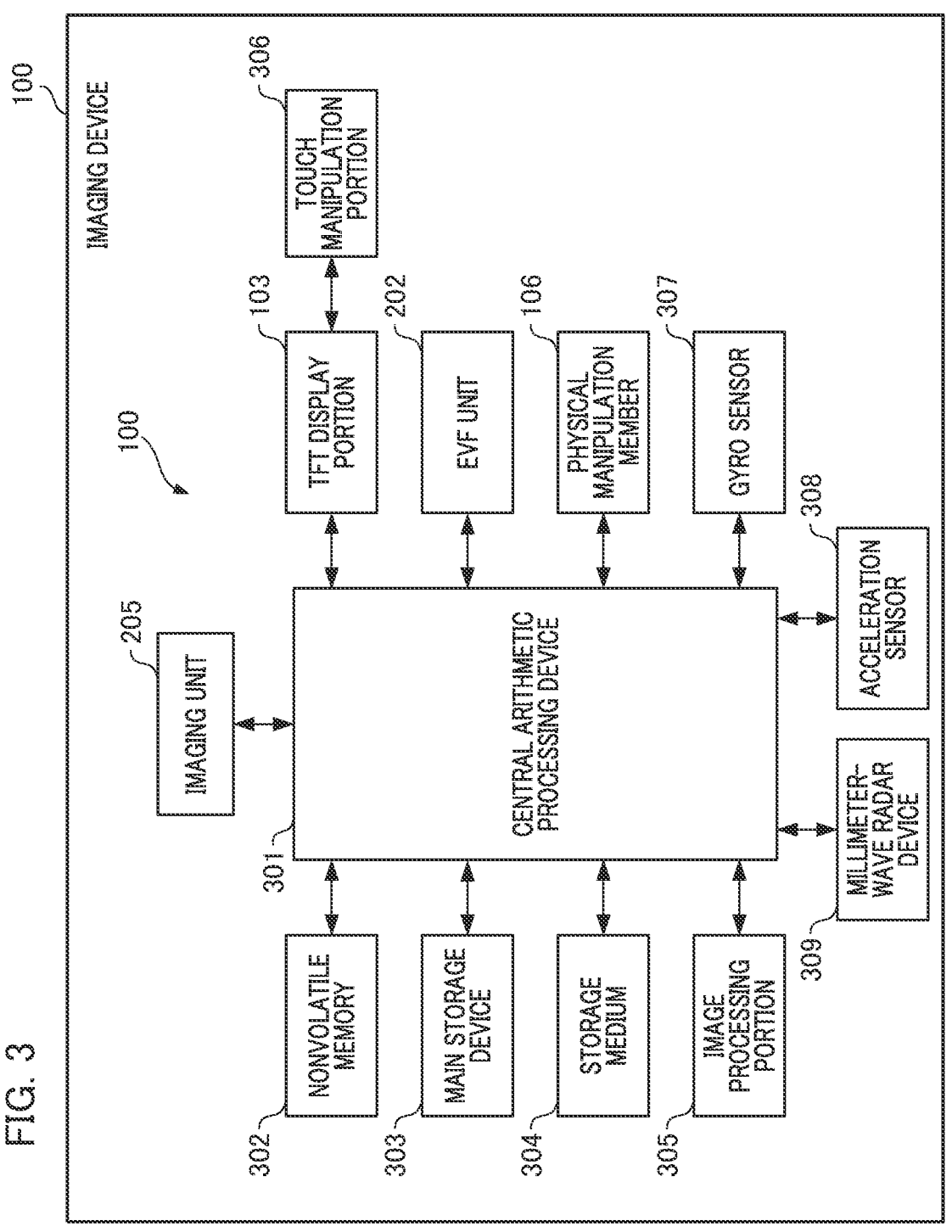
FIG. 3 is an example of a functional block diagram of the imaging device.

A normal position manipulation member 104 is a manipulation member used during vertical position imaging. The vertical position manipulation member 105 is a manipulation member used during vertical position imaging. At the time of normal position imaging or the like, it is possible to disable a manipulation input using the vertical position manipulation member 105 according to control from a central arithmetic processing device 301 (FIG. 3).

Thereby, it is possible to prevent a malfunction even if the user touches the vertical position manipulation member 105 during the normal position imaging. A physical manipulation member 106 is a general term for a manipulation member that the user physically manipulates. A TFT display portion 103 is a display device for displaying predetermined information. TFT is an abbreviation for Thin Film Transistor. The TFT display portion 103 displays, for example, a menu screen, information of a reproduced image, and the like.

Figure 2:
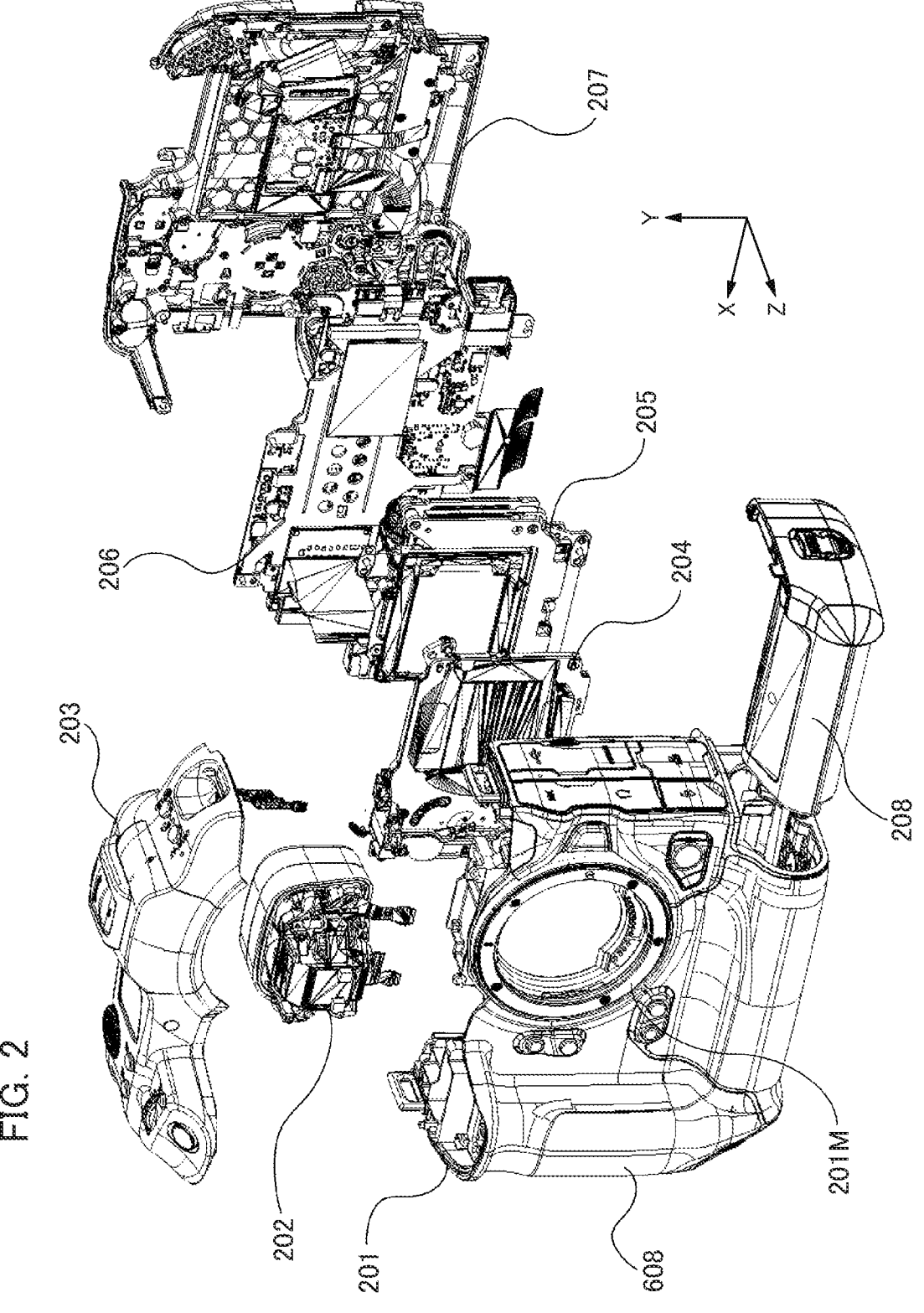
FIG. 2 is an example of an exploded perspective view of an imaging device.

FIG. 2 is an example of an exploded perspective view of the imaging device. A depth direction of the imaging device, i.e., an optical axis direction of an imaging optical system provided in the imaging device, is defined as a Z-axis direction. A left/right direction perpendicular to the optical axis (a longitudinal direction of the imaging device) is defined as an X-axis direction. An upward/downward direction perpendicular to the optical axis (a transverse direction of the imaging device) is defined as a Y-axis direction.

The front cover unit 201 is a part of a main body of the imaging device 100 and is an exterior part on a front surface of the imaging device 100. The front cover unit 201 also serves as a chassis that maintains the rigidity of the imaging device 100. The front cover unit 201 is mainly formed of a lightweight and strong magnesium alloy or the like to maintain rigidity of the chassis, but the material of the front cover unit 201 is not limited to the magnesium alloy. In models focusing on low cost and weight reduction, the front cover unit 201 may be formed of resin or the like.

Moreover, in the front cover unit 201, a lens mount 201M for lens mounting and telecommunication, an electrical contact pin, a physical manipulation button on the front, an earring for hanging a strap, and the like are assembled. Also, a battery compartment for storing a battery 208 is formed by combining the front cover unit 201 and a bottom cover (not shown).

Because the front surface of the front cover unit 201 is an exterior surface, it is painted for aesthetics and a rubber grip 608 formed of nitrile butadiene rubber (NBR)/polyvinyl chloride (PVC) or the like for gripping the imaging device 100 is also attached. Units to be described below are sequentially assembled to stack on a rear surface of the front cover unit 201.

An electronic viewfinder (EVF) unit 202 is an eyepiece portion having an eyepiece lens, a visibility adjustment mechanism, an organic electro-luminescence (EL) liquid crystal panel, and the like. The EVF unit 202 is connected to a main board unit 206 via an FPC. FPC is an abbreviation for Flexible Printed Circuits.

In a conventional imaging device, the EVF unit includes an eye contact detection sensor (proximity sensor) that detects the user's eye contact with the EVF unit. As the eye contact detection sensor, a sensor based on a method of radiating infrared light and detecting the proximity of a physical object according to the presence or absence of reflected light reflected on the physical object is often used.

However, in the imaging device of the present embodiment, the EVF unit 202 does not have the eye contact detection sensor because eye contact detection is performed by a millimeter-wave radar device 309 (FIG. 3) with which the function of a conventional eye contact detection sensor is replaced.

Moreover, an image captured by the imaging unit 205 is displayed in real time on an organic EL or a liquid crystal panel arranged within the EVF unit 202, and therefore the user can confirm an angle of view of imaging. Moreover, the EVF unit 202 can display a menu screen displayed on the TFT display portion 103 and information similar to information of a reproduced image, and the user can confirm the displayed information in an eye contact state.

In a top cover unit 203, a release button, an accessory shoe, a normal position manipulation member 104 that changes settings at the time of imaging, a liquid crystal panel that displays a state of settings made with the normal position manipulation member 104, and the like are arranged.

Because the top cover unit 203 is an exterior part and requires strength against falling impact and the like, the top cover unit 203 is formed of, for example, a magnesium alloy or the like, and its exterior surface is painted. A material of the top cover unit 203 is not limited to the magnesium alloy. In models focused on low cost and weight reduction, the top cover unit 203 may be formed of resin or the like.

A shutter unit 204 determines an amount of exposure. The shutter unit 204, for example, has a mechanical shutter including a focal plane shutter, a sequencing mechanism, and the like. In addition, an electronic shutter configured to determine the amount of exposure by forming an electrical slit for each pixel array of the imaging element may be applied to the imaging device 100. Moreover, an electronic shutter and a mechanical shutter may be used in combination to form a slit and may be used to determine the amount of exposure.

The imaging unit 205 functions as an imaging unit for imaging a subject. The imaging unit 205 photoelectrically converts subject light and outputs a signal related to a captured image. The imaging unit 205 includes an imaging drive circuit, an imaging element, an analog-to-digital (A/D) conversion circuit, and a stabilizer unit.

The imaging drive circuit drives the imaging element. The imaging element performs photoelectric conversion of the subject light and outputs an analog signal. The imaging element is, for example, a charge-coupled device (CCD), a complementary metal oxide semiconductor (CMOS), or the like.

The A/D conversion circuit converts the analog signal output by the imaging element into a digital signal. The stabilizer unit swings the imaging element in a drive method using an electromagnetic force. Thereby, blurring (image blur) occurring in a captured image due to shaking, vibrations, or the like of the imaging device 100 is corrected.

The main board unit 206 is a multilayer board that controls the entire imaging device 100. The main board unit 206 is equipped with an integrated circuit (IC) such as the central arithmetic processing device 301 and a nonvolatile memory 302 of FIG. 3, a connector for connecting the FPC extended from each unit, and the like.

The rear cover unit 207 is a part of the main body of the imaging device 100 and an exterior part on the rear side. In the rear cover unit 207, the TFT display portion 103 and a touch manipulation portion 306 (FIG. 3) are provided. The TFT display portion 103 has a vari-angle mechanism that can be opened, closed, and rotated, and includes a liquid crystal panel.

The vari-angle mechanism is provided, and therefore the TFT display portion 103 functions as a movable member movable (openable and closeable) with respect to the main body of the imaging device 100. The TFT display portion 103 is in an open state when the vari-angle mechanism is open and the TFT display portion 103 is in a closed state when the vari-angle mechanism is closed.

In the conventional imaging device, a TFT opening/closing detection sensor that detects the open or closed state of the TFT display portion 103 is arranged within the rear cover unit 207. As the TFT opening/closing detection sensor, for example, a magnetic detection type giant magnetoresistance (GMR) sensor is applied.

However, in the imaging device of the present embodiment, the millimeter-wave radar device 309 (FIG. 3) with which the function of the conventional TFT opening/closing detection sensor is replaced detects the open or closed state of the TFT display portion 103. Therefore, a conventional TFT opening/closing detection sensor is not provided within the rear cover unit 207.

Moreover, various physical manipulation members 106 used for selecting a distance measurement point at the time of imaging, changing the settings of the imaging device 100, reproducing/erasing or editing the imaged image, and the like are arranged within the rear cover unit 207. Because the rear cover unit 207 is an exterior part and requires strength against falling impact and the like, the rear cover unit 207 is formed of, for example, a magnesium alloy or the like, and its exterior surface is painted.

In addition, a material of the rear cover unit 207 is not limited to the magnesium alloy. In models focusing on low cost and weight reduction, the rear cover unit 207 may be formed of resin or the like.

FIG. 3 is an example of a functional block diagram of the imaging device. The imaging device 100 includes parts from the TFT display portion 103 to the millimeter-wave radar device 309. The central arithmetic processing device 301 controls the entire imaging device 100. The central arithmetic processing device 301 includes a microprocessor or the like that executes various processes of the imaging device 100. The central arithmetic processing device 301, the nonvolatile memory 302, the main storage device 303, and the image processing unit 305 are implemented with an IC or a microcomputer.

The touch manipulation portion 306 is a manipulation portion used for a touch manipulation. A gyro sensor 307 is a sensor that detects a change in the rotation or direction of the imaging device 100 as an angular velocity using a Coriolis force and outputs a detection result as an electrical signal. The gyro sensor 307 is mounted on the FPC (not shown) and can detect an angular velocity in directions of X-, Y-, and Z-axes. For this reason, three sensors serving as the gyro sensor 307 are arranged within the top cover unit 203 and sandwiched in a sponge or the like so that they are not affected by unnecessary vibrations and shocks of the imaging device 100.

The central arithmetic processing device 301 estimates a shaking or vibration direction of the imaging device 100 in accordance with the output result of the gyro sensor 307. The central arithmetic processing device 301 performs feedback control by the stabilizer unit so that the imaging element swings in a direction in which the estimated shaking is canceled. Thereby, the image blur that occurs in the captured image is corrected.

The acceleration sensor 308 is one of inertial sensors intended for measuring gravity, movement, vibrations, and shocks and is a sensor that detects the three-dimensional inertial motion (translational motion in the orthogonal triaxial direction) of the imaging device 100. For example, a detection method of a frequency change type, a piezoelectric type, a piezoresistive type, or an electrostatic capacitance type can be applied to the acceleration sensor 308.

With an output value of the acceleration sensor 308, it is possible to detect movement of the X-, Y-, and Z-axes of the imaging device 100, the translational direction, the gravity direction, and the like. Output values of the gyro sensor 307 and the acceleration sensor 308 are combined, and therefore it is possible to determine an attitude or movement state of the imaging device 100.

The central arithmetic processing device 301 receives a signal related to the captured image output by the imaging unit 205 and outputs the received signal as a video signal to an organic EL liquid crystal panel that is a display unit within the TFT display portion 103 or in the EVF unit 202. Moreover, the central arithmetic processing device 301 performs a process of developing the video signal as image data and recording the image data on a storage medium 304, a process of reading a stored image from the storage medium 304, and the like.

The nonvolatile memory 302 stores a control program for an apparatus control process for imaging or the like, an operating system (OS), and the like in advance. Moreover, the nonvolatile memory 302 stores, for example, setting information, information to be held even while the imaging device 100 is turned off, transferred information generated every time the image data is transferred, and the like.

The nonvolatile memory 302 has a flash memory or the like. The main storage device 303 is used to temporarily store data of the image processing unit 305. The main storage device 303 includes a random-access memory (RAM) and the like.

The storage medium 304 stores image data obtained in an imaging process. For example, a slot-type connector socket is mounted on the main board unit 206 and a card-type storage medium 304 can be detached/replaced via a connector socket.

The image processing unit 305 performs image processing such as subject recognition and image analysis for captured images and moving images. When the image processing unit 305 recognizes the subject, the central arithmetic processing device 301 calculates and defines a range of the recognized subject and the recognized range (zone) can be displayed on the TFT display portion 103.

The millimeter-wave radar device 309 is a radar device that detects a target object by radiating millimeter waves, which is an example of radio waves of a specific wavelength. Here, millimeter waves are radio waves with a wavelength of 1 mm or more and 10 mm or less and a frequency of 30 GHz or more and 300 GHz or less. The millimeter-wave radar device 309 is a device called a synthesizer that generates a millimeter-wave signal and transmits the millimeter-wave signal from a TX antenna for transmission.

The millimeter-wave radar device 309 continuously performs transmission while gradually changing the frequency of the millimeter waves in a continuous frequency modulation scheme, measures reflected waves reflected back to the target object to determine the target object, and detects a distance to the target object. Specifically, the reflected waves reflected back to the target object are received by an RX antenna for reception and an intermediate frequency (IF) signal is generated by mixing a transmitted millimeter wave signal and a received reflected wave signal.

Also, a distance to the target object is calculated in a calculation process based on the IF signal. The millimeter-wave radar device 309 can obtain a distance to the target object, a speed of the target object, a direction of the target object, the presence of the target object, an approximate shape, and the like by performing continuous objective ranging in accordance with a temporal delay difference of the reflected waves or the like.

The feature of the millimeter-wave radar device 309 is that the target object can be detected through a nonmetallic material such as resin or glass. According to this feature, the millimeter-wave radar device 309 can detect the target object even in environments with poor visibility such as rain and fog and can be arranged inside a housing of the installed device.

Figures 4A, 4B:
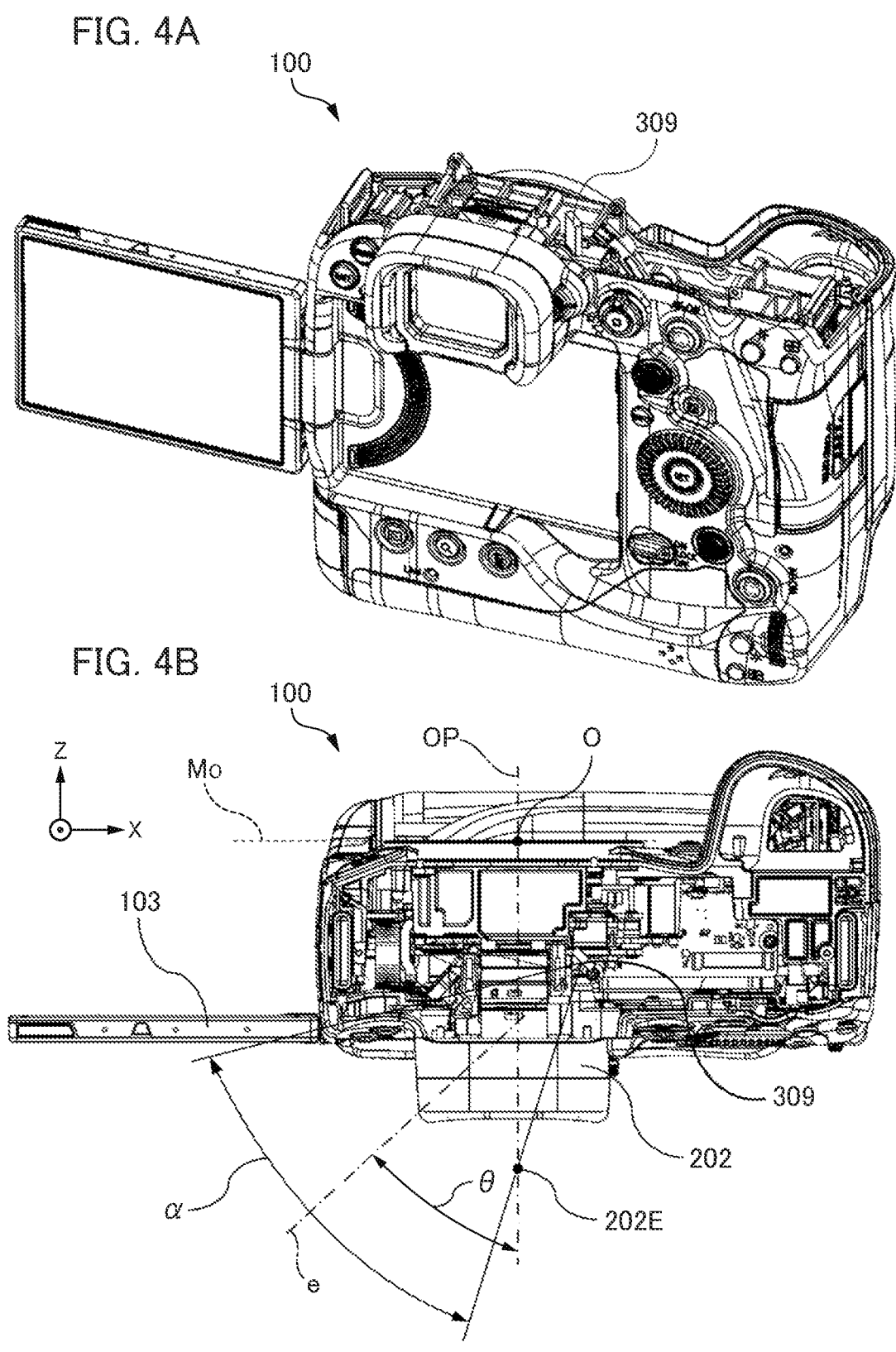
FIG. 4A and FIG. 4B are diagrams showing examples of states in which the imaging device is viewed from the rear and above.

FIG. 4A and FIG. 4B are diagrams showing examples of a state in which the imaging device is viewed from the rear and a state in which the imaging device is viewed from above.

FIG. 4A shows a state in which the imaging device 100 is viewed from the rear. FIG. 4B shows a state in which the imaging device 100 is viewed from above. In the examples shown in FIGS. 4A and 4B, the imaging device 100 is in a state in which the top cover unit 203 is removed, the vari-angle mechanism is open, and the TFT display portion 103 is open to the photographer side.

Because there is a characteristic that the millimeter waves are transmitted through a part formed of a plastic or glass with a low dielectric constant, the millimeter waves can be transmitted through the resin parts and the eyepiece lens group of the imaging device 100.

Therefore, even if the millimeter-wave radar device 309 is arranged inside the imaging device 100, a target object located within a predetermined distance can be detected. In the present embodiment, the millimeter-wave radar device 309 is arranged in the imaging device 100 at a position and attitude where the attitude (open or closed state) of the TFT display portion 103 and the eye contact with the EVF unit 202 can be simultaneously detected.

Because the functions of the TFT opening/closing detection sensor and the eye contact detection sensor provided in the conventional imaging device are replaced with the millimeter-wave radar device 309, it is possible to implement the reduction of the cost and miniaturization of the imaging device 100 and the like.

The millimeter-wave radar device 309 is implemented with the FPC (not shown). A radio-wave (millimeter-wave) irradiation range of the millimeter-wave radar device 309 is expressed by an orientation angle α. Also, in the millimeter-wave radar device 309, an angle of a radar detection center axis e for an optical axis OP (a detection center axis angle) is arranged at a position near the right side of the EVF unit 202 with an attitude of θ. The radar detection center axis e is a central axis (radio wave axis) in an orientation direction of the millimeter-wave radar device 309.

In FIG. 4B, the mount surface of the lens mount 201M (FIG. 2) is denoted by Mo and an intersection point between Mo and the optical axis OP of the imaging device 100 is defined as an origin O. At this time, the X-coordinate of the radar origin of the millimeter-wave radar device 309 is denoted by Lx, the Z-coordinate is denoted by Lz, and an eye point position of the EVF unit 202 is denoted by 202E.

Figure 5:
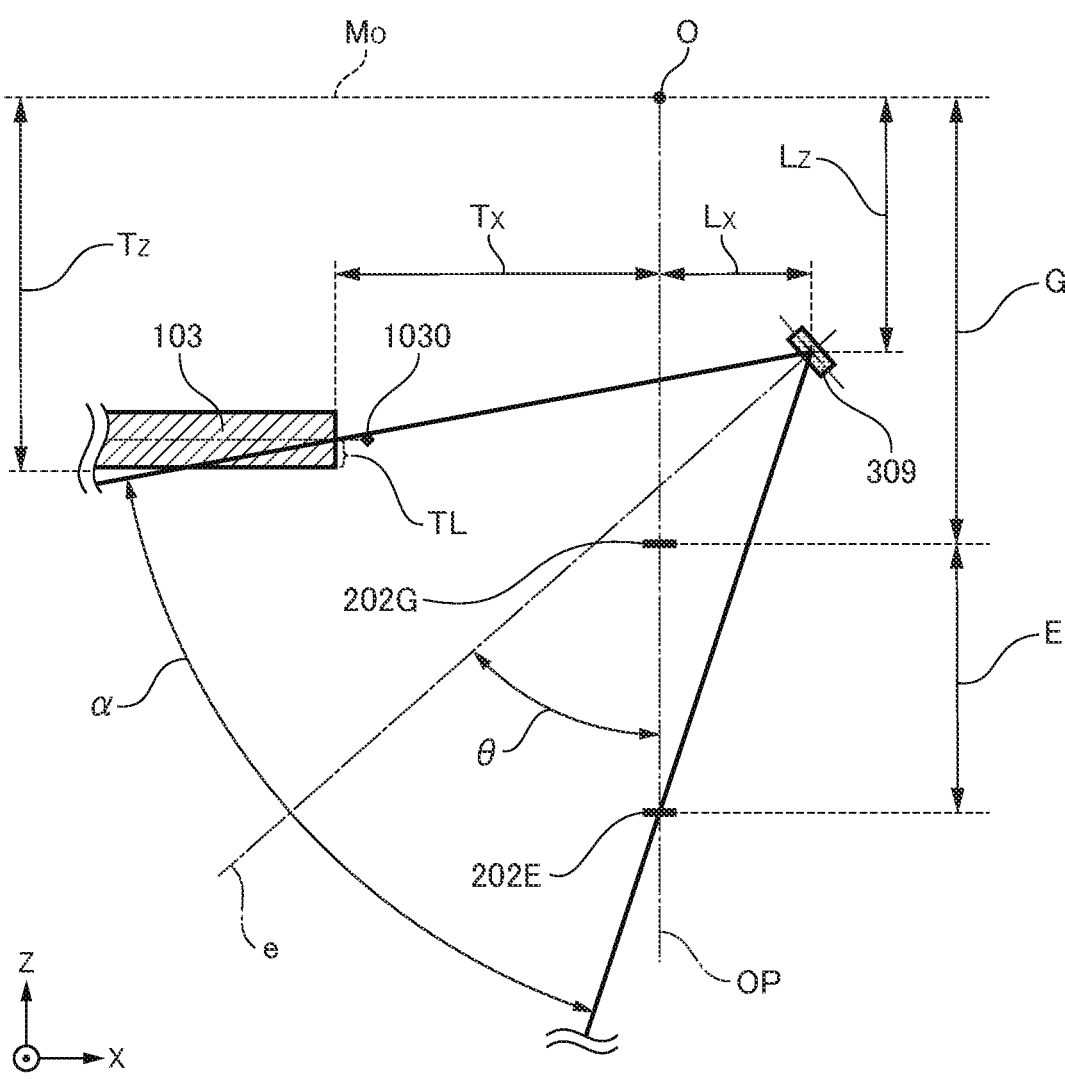
FIG. 5 is a top view for describing an arrangement of a millimeter-wave radar device.

FIG. 5 is a diagram showing an arrangement of the millimeter-wave radar device. In FIG. 5, the arrangement and dimensions of the TFT display portion 103 in the open state, the eye point position 202E, an eye point reference position 202G, and the millimeter-wave radar device 309 based on the origin O are shown. In FIG. 5, the arrangement and dimensions are projected onto the XZ plane.

Hereinafter, the distance is on the projection plane. Here, the eye point corresponds to a maximum distance from a position closest to the photographer of the member around an eyepiece frame or a rearmost position of the eyepiece lens including the protective glass to a position of a pupil where all images and all information within the viewfinder can be seen.

The eye point value has a value of 18 mm or more and 25 mm or less, more preferably 20 mm or more and 23 mm or less, so that even a user wearing glasses or a user with a chiseled face can recognize the display within the viewfinder.

As the dimensions related to the TFT display portion 103, the coordinate Tx of its end in the X-axis direction and the coordinate Tz of its end in the Z-axis direction are shown as the arrangement information of the TFT display portion 103. The amount of detection TL indicates a size of a region of the TFT display portion 103 where the TFT display portion 103 and the radio waves (millimeter waves) interfere with each other, as the minimum necessary for detecting the attitude of the TFT display portion 103 with the millimeter-wave radar device 309.

A value of TL has a value of 1 mm or more and 3 mm or less, more preferably 3 mm or more and 10 mm or less, so that it is not undetectable due to a positional deviation of the TFT display portion after the opening and closing operation or a deviation in the dimensional tolerance of the TFT display portion itself.

Moreover, an eye point value E and a distance G from the origin to the eye point reference position 202G are shown as information about the eye point. The eye point value E indicates a distance from the eye point reference position 202G to the eye point position 202E. Moreover, the distance G has a value of coordinates of an eye point reference (reference coordinates of the eye point).

The eye point reference is, for example, a final optical system, a viewfinder eyepiece frame, or the like. The eye point position 202E needs to be within a radio-wave irradiation range of the millimeter-wave radar device 309 because it is necessary to determine whether the photographer is present at the eye point position so that the millimeter-wave radar device 309 detects the eye contact.

Next, the position and attitude of the millimeter-wave radar device 309 capable of simultaneously detecting the open or closed state of the TFT display portion 103 and eye contact of the EVF unit 202 are expressed by an equation using dimensions shown in FIG. 5.

When a relationship between the dimensions according to the TFT display portion 103 is summarized, Eq. (1) is derived.

$$TL = Tz - Lz - (Tx + Lx)\tan\left(90 - \frac{1}{2}\alpha - \theta\right) \qquad \text{Eq. (1)}$$

TL, Tx, and Tz are unique values for each imaging device 100 and change with a body size and/or a structure and/or position of the TFT display portion 103. The orientation angle α is a characteristic value of the millimeter-wave radar device 309. Thus, TL, Tx, Tz, and a are actually constants.

That is, in Eq. (1), an amount of detection TL can be set in any range by determining the X-coordinate Lx, the Z-coordinate Lz, and θ of the millimeter-wave radar device 309. At this time, it is necessary to set Lx, Lz, and θ so that a value of the amount of detection TL, i.e., the right side of Eq. (1), is positive to detect the open or closed state of the TFT display portion 103. When the right side of Eq. (1) has a negative value, the millimeter-wave radar device 309 cannot detect the open or closed state of the TFT display portion 103.

Figure 6:
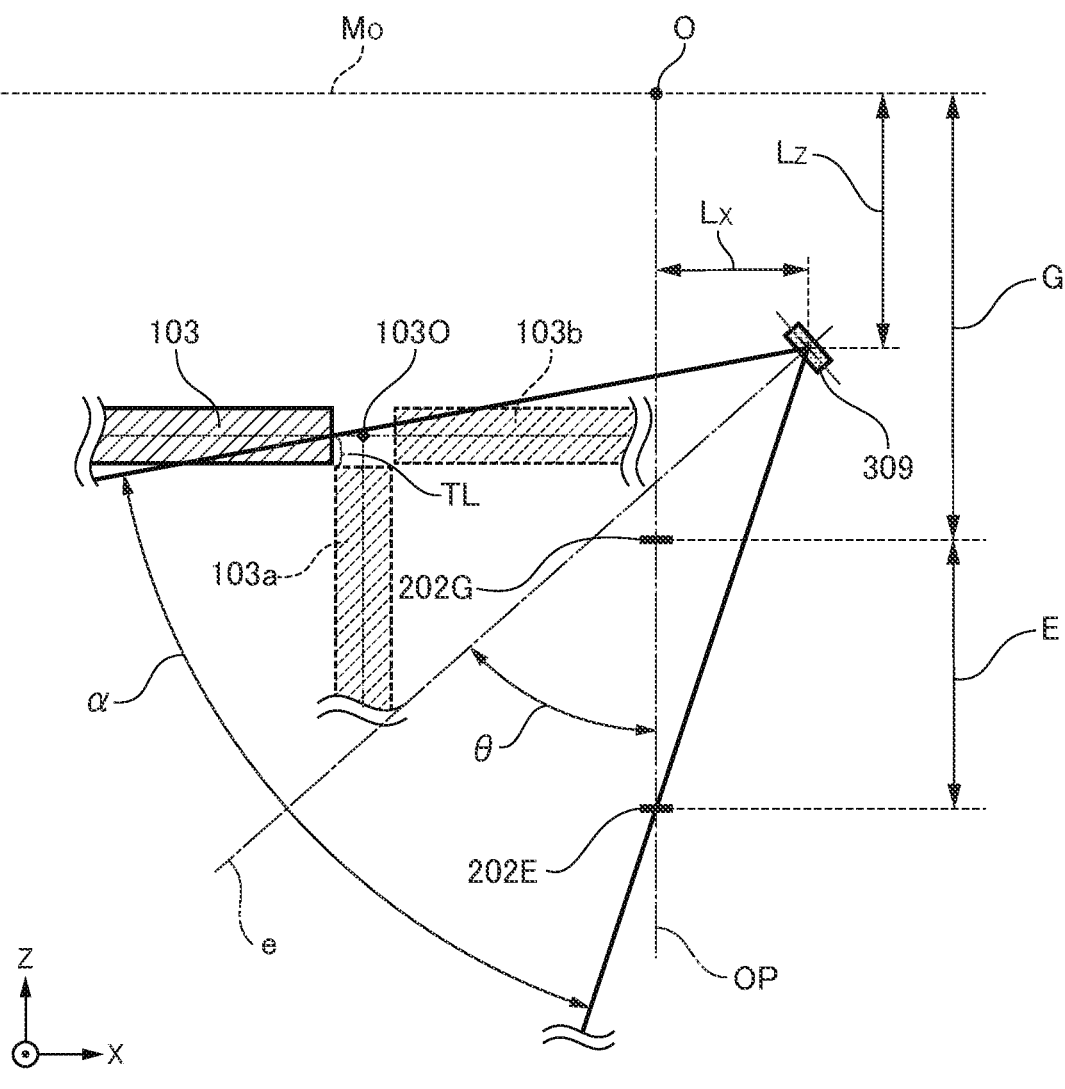
FIG. 6 is a diagram for describing an example of the state transition of a TFT display portion.

FIG. 6 is a diagram showing an example of the state transition of the TFT display portion from the open state to the closed state. A movable direction of the TFT display portion 103 from the open state is only counterclockwise rotational movement with a vari-angle rotation axis 1030 as a rotation center.

In the example shown in FIG. 6, the TFT display portion 103 can transition to states indicated by reference signs 103*a* and 103*b*. In the example shown in FIG. 6, a part of the TFT display portion 103 is continuously located within the orientation angle α, and therefore the part can be continuously detected regardless of the attitude of the TFT display portion 103. Moreover, because a detection distance changes with a rotation position of the TFT display portion 103, the millimeter-wave radar device 309 can detect the open or closed state of the TFT display portion 103.

Next, when a relationship between the dimensions of the EVF unit 202 is summarized, Eq. (2) is derived.

$$E = Lx \tan\left(\theta - \frac{1}{2}\alpha\right) - G + Lz \qquad \text{Eq. (2)}$$

G and E are unique values for each imaging device 100 and change with the optical performance of the EVF unit 202. α is a characteristic value of the millimeter-wave radar device 309.

Figure 7:
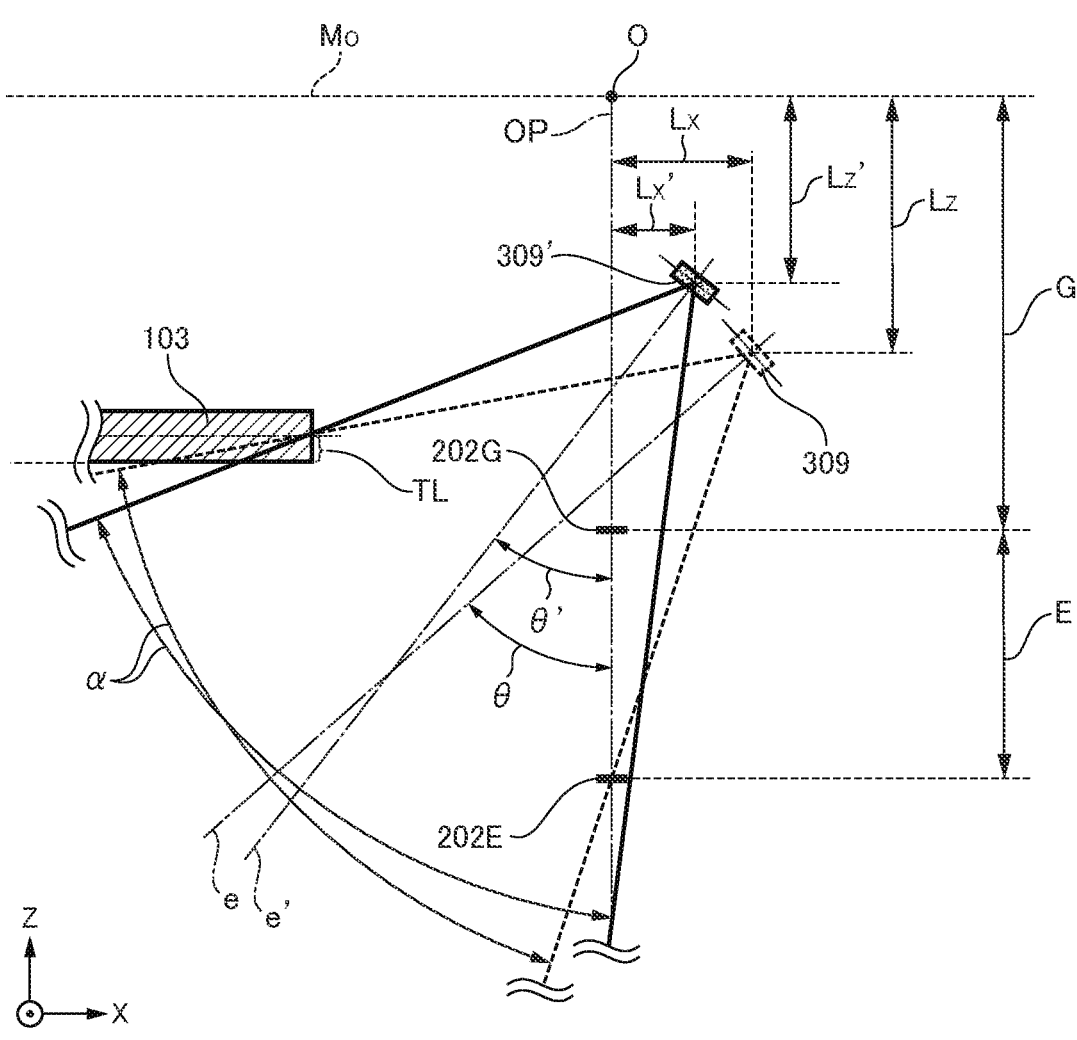
FIG. 7 is a diagram showing a positional relationship between a radio-wave irradiation range and an eye point position.

FIG. 7 is a diagram showing a positional relationship between a radio-wave irradiation range of the millimeter-wave radar device and an eye point position. The conditions of Eq. (2) for enabling eye contact detection will be described with reference to FIG. 7.

It is necessary to detect the photographer on the +Z-side of the eye point position 202E so that it is determined whether or not the photographer is making eye contact. Therefore, the eye point position 202E needs to be necessarily located within the radio-wave irradiation range corresponding to the orientation angle α.

That is, a state in which the eye point position 202E positioned on the optical axis OP on a projection plane and the end of the range of the orientation angle α exactly overlap is a boundary condition of radio-wave irradiation that enables eyepiece detection, as in the millimeter-wave radar device 309 indicated by a dotted rectangle in FIG. 7.

As in a millimeter-wave radar device 309' indicated by a bold rectangle in FIG. 7, eye contact detection can be performed without omission when an intersection point between the optical axis OP and the edge of the radio-wave irradiation range is located in the −Z-direction from the eye point position 202E.

When the intersection point between the optical axis OP and the edge of the radio-wave irradiation range is located in the +Z-direction from the eye point position 202E, there is a region in which eye contact detection cannot be performed even if the photographer approaches the eye point position 202E.

Therefore, it is necessary to set the X-coordinate Lx, the Z-coordinate Lz, and the detection center axis angle θ of the millimeter-wave radar device 309 in Eq. (2) so that the intersection point between the optical axis OP and the edge of the radio-wave irradiation range is located in the −Z-direction from the eye point position 202E.

By obtaining Lx, Lz, and θ so that Eq. (1) and Eq. (2) are valid, the arrangement of the millimeter-wave radar device 309 capable of simultaneously detecting the open or closed state of the TFT display portion 103 and the eye contact with the EVF unit 202 is determined. However, it is not possible to uniquely determine Lx, Lz, and θ because relational equations are only two equations, i.e., Eq. (1) and Eq. (2)

while unknowns related to the arrangement of the millimeter-wave radar device 309 are three types of Lx, Lz, and θ.

Therefore, first, it is necessary to determine any one of the values of Lx, Lz, and θ on the basis of conditions dependent on the model of the imaging device 100. For example, the value of Lx is determined if it is assumed that the millimeter-wave radar device 309 is assembled on the X-side of the EVF unit 202 or the value of Lz is determined if it is assumed that the millimeter-wave radar device 309 is assembled on the rear cover unit 207.

It is only necessary for a designer to determine which parameters should be prioritized on the basis of the design concept differing according to each model of the imaging device 100. Because there are two unknowns for Eq. (1) and Eq. (2) if one of Lx, Lz, and θ is determined, all of Lx, Lz, and θ can be determined by solving a system of equations.

According to the conditions in Eq. (1) and Eq. (2) described above, Lx, Lz, and θ are set so that TL is a positive value and the intersection point between the optical axis OP and the edge of the radio-wave irradiation range is located in the −Z-direction from the eye point position 202E.

The set Lx, Lz, and θ indicate a position and attitude of the millimeter-wave radar device 309 that enables the millimeter-wave radar device 309 to simultaneously detect the open or closed state of the TFT display portion 103 and the eye contact detection of the EVF unit 202. According to the imaging device of the present embodiment, the functions of the eye contact detection sensor and the TFT opening/closing detection sensor installed in the conventional model can be replaced with the millimeter-wave radar device 309. As a result, the number of installed sensors can be reduced and the cost of the system can be reduced.

Next, when the millimeter-wave radar device 309 is arranged within the imaging device 100, Lx, Lz, and θ satisfying Eq. (1) and Eq. (2) are set, and further considerations are described. One of the characteristics of devices using radio waves is that when other devices emit radio waves in the same band, if the radio-wave irradiation ranges overlap, interference occurs and the radio waves are attenuated.

The other devices are, for example, devices of the wireless LAN standard IEEE802.11ad/ay with a millimeter-wave band. Therefore, it is desirable to arrange the millimeter-wave radar device 309 so that a radio-wave irradiation range of the millimeter-wave radar device 309 does not overlap an irradiation range of radio waves from a device different from the millimeter-wave radar device 309 provided in the imaging device 100.

Moreover, there is a characteristic that radio waves are attenuated by electromagnetic waves from the surroundings. Therefore, it is desirable not to arrange the millimeter-wave radar device 309 in a region where electromagnetic waves are generated within the electronic apparatus (within the imaging device 100). For example, the millimeter-wave radar device 309 is arranged in a region different from a region where electromagnetic waves are generated from a coil or the like within the imaging unit 205.

According to the above-described configuration, the radio waves of the millimeter-wave radar device 309 and other wireless devices do not interfere with each other and the influence of electromagnetic waves can be prevented. Thereby, it is possible to prevent problems such as poor detection due to radio-wave attenuation of the millimeter-wave radar device 309 and unintentional reduction of the detection range.

Moreover, when the imaging device 100 images a subject, if radio waves pass through the imaging element or the board on which the imaging element is mounted, there is a possibility that periodic voltage fluctuations will occur and noise will occur in the captured image. Moreover, because metals such as solder and wiring are used in the imaging element and the board on which the imaging element is mounted, radio waves are easily blocked.

Therefore, it is desirable to arrange the millimeter-wave radar device 309 closer to the TFT display portion 103 than to the imaging element. According to this configuration, it is possible to prevent the occurrence of noise in the captured image because the radio waves of the millimeter-wave radar device 309 do not pass through the imaging element and furthermore it is also possible to avoid a problem of occurrence of poor detection because the radio waves are not blocked.

Although preferred embodiments of the present disclosure have been described above, the present disclosure is not limited to these embodiments and various modifications and changes are possible within the scope of the present disclosure.

Embodiment 2

Next, an arrangement of a millimeter-wave radar device 309 for units and modules provided in an imaging device 100 will be described as a second embodiment. In addition, in the description of the second embodiment, parts whose description is omitted have configurations similar to those of the first embodiment.

First, an arrangement relationship between an imaging unit 205 and the millimeter-wave radar device 309 will be described with reference to FIGS. 8 and 9. First, when an imaging element 310 is arranged within a range of a radar-specific orientation angle $\alpha$ on an XZ plane of FIG. 5, an arrangement of the millimeter-wave radar device 309 on a YZ plane will be described.

Figure 8:
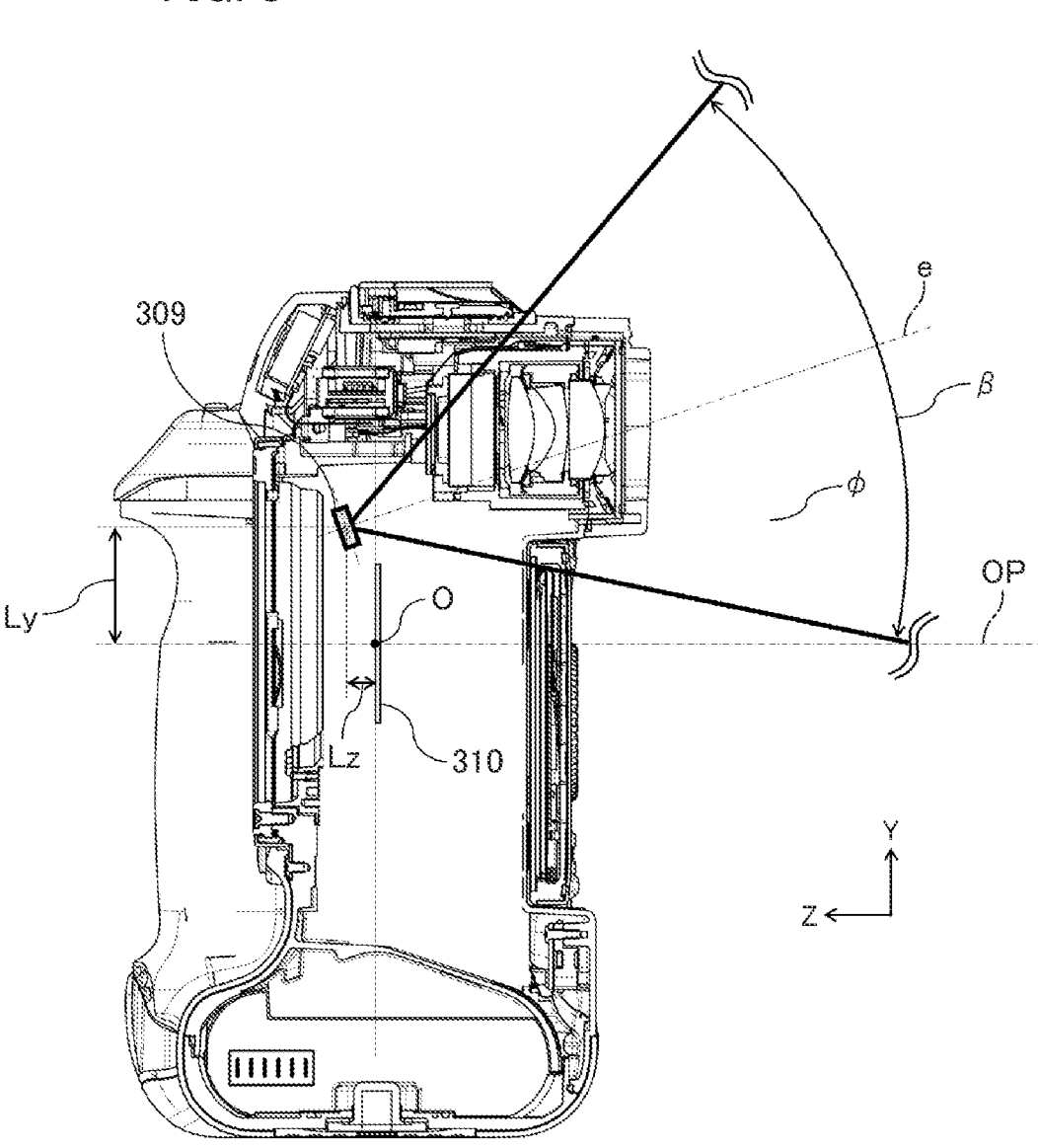
FIG. 8 is a side view for describing an arrangement of a millimeter-wave radar device.
Figure 9:
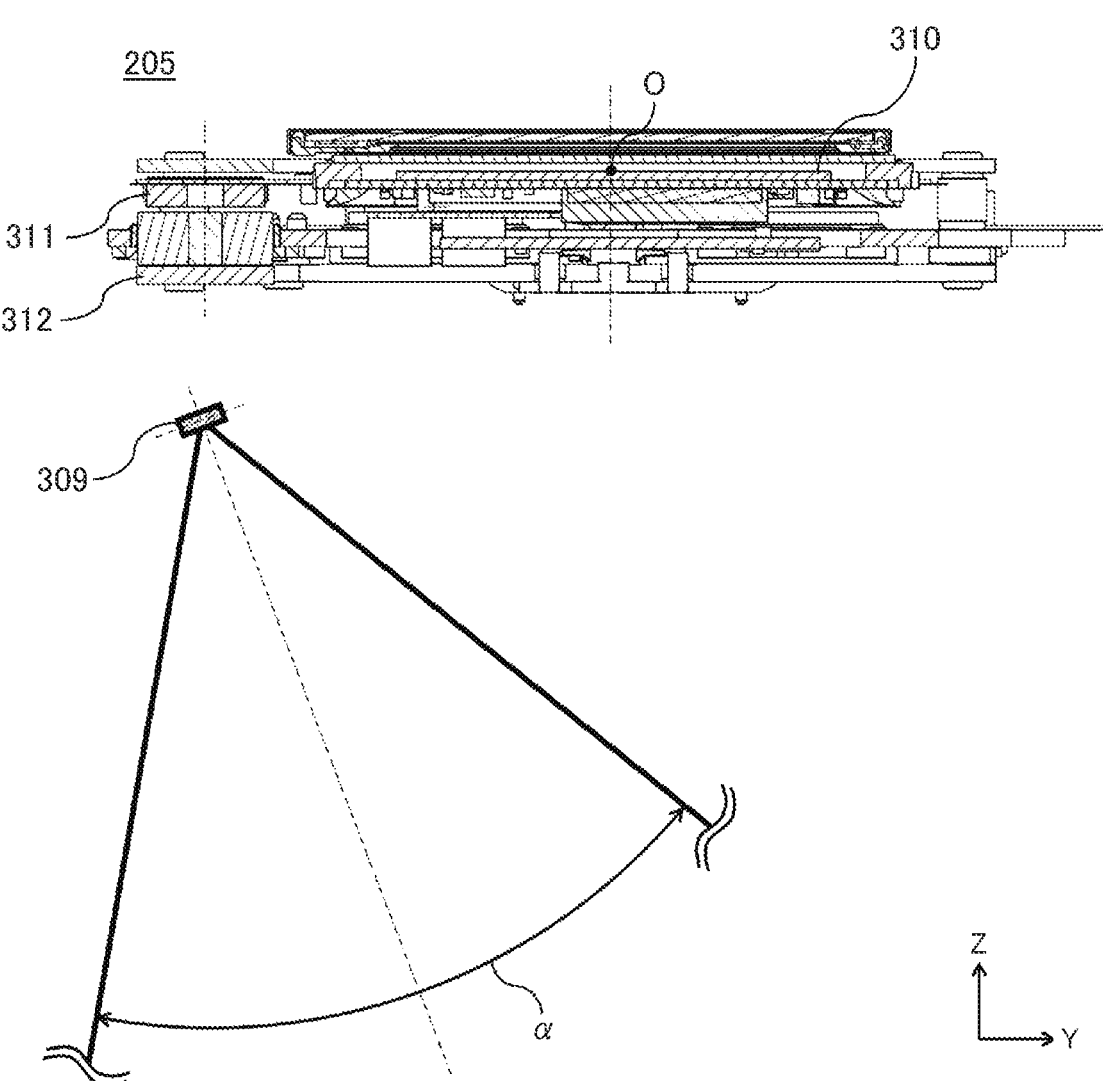
FIG. 9 is a diagram showing a positional relationship between a millimeter-wave radar device and a coil.

FIG. 8 is a diagram showing an arrangement of the millimeter-wave radar device 309 in the imaging device 100 on the YZ plane. In FIG. 8, a Y-coordinate of the millimeter-wave radar device 309 is denoted by Ly, an angle of a radar detection center axis e on the YZ plane for an optical axis OP (detection center axis angle) is denoted by $\phi$, and an orientation angle on the YZ plane of the millimeter-wave radar device 309 is denoted by $\beta$. Here, a value of the orientation angle $\beta$ of the millimeter-wave radar device 309 on the YZ plane may be different from that of the orientation angle $\alpha$ on the XZ plane.

At this time, when Lx, Lz, and $\theta$ have values at which the imaging element 310 is arranged within the range of the radar-specific orientation angle $\alpha$ on the XZ plane, Ly and $\phi$ are determined to have values at which the imaging element 310 is not arranged within a range of the radar-specific orientation angle $\beta$ on the YZ plane. As a result, it is possible to avoid an arrangement of the imaging element 310 within a range of a radar-specific three-dimensional orientation angle.

By taking this configuration, radio waves of the millimeter-wave radar device 309 do not pass through the imaging element 310 and the board on which the imaging element 310 are mounted. For this reason, as described above with reference to Embodiment 1, because noise does not occur in the captured image and radio waves are not blocked, a problem of occurrence of poor detection can also be avoided.

Next, an arrangement relationship between the stabilizer unit provided in the imaging unit 205 and the millimeter-wave radar device 309 will be described with reference to FIG. 9. The stabilizer unit has a coil 311 to swing the imaging element 310 using an electromagnetic force. At this time, a part capable of blocking radio waves such as a metallic plate 312 made of a material of metal, for example, steel plate cold commercial (SPCC), is arranged between the coil 311 and the millimeter-wave radar device 309. Because the metallic plate 312 has magnetism, it also functions as a yoke for the magnet necessary for the swinging of the imaging element 310.

Here, when external electromagnetic waves interfere with the radio waves of the millimeter-wave radar device 309, the electromagnetic waves become noise and affect the detection ability. However, according to the above-described configuration, because there is a characteristic that the electromagnetic waves are reflected by the metal, the electromagnetic waves generated when an electric current flows through the coil 312 due to the swinging of the imaging element 310 is reflected by the metallic plate 312.

Thereby, it is possible to reduce the influence of interference by electromagnetic waves generated by the coil 312 on the radio waves of the millimeter-wave radar device 309 and to reduce the risk of occurrence of poor detection. Moreover, a noise suppression sheet such as an electromagnetic wave absorption sheet may be used instead of the metallic plate 312.

Next, an arrangement relationship between the millimeter-wave radar device 309 and a radio antenna module 313 will be described with reference to FIG. 10A and FIG. 10B. As described above in Embodiment 1, the radio antenna module 313 is arranged within the imaging device 100 so that the imaging device 100 communicates with other devices using, for example, the wireless LAN standard IEEE 802.11ad/ay with a millimeter-wave band.

Figures 10A, 10B:
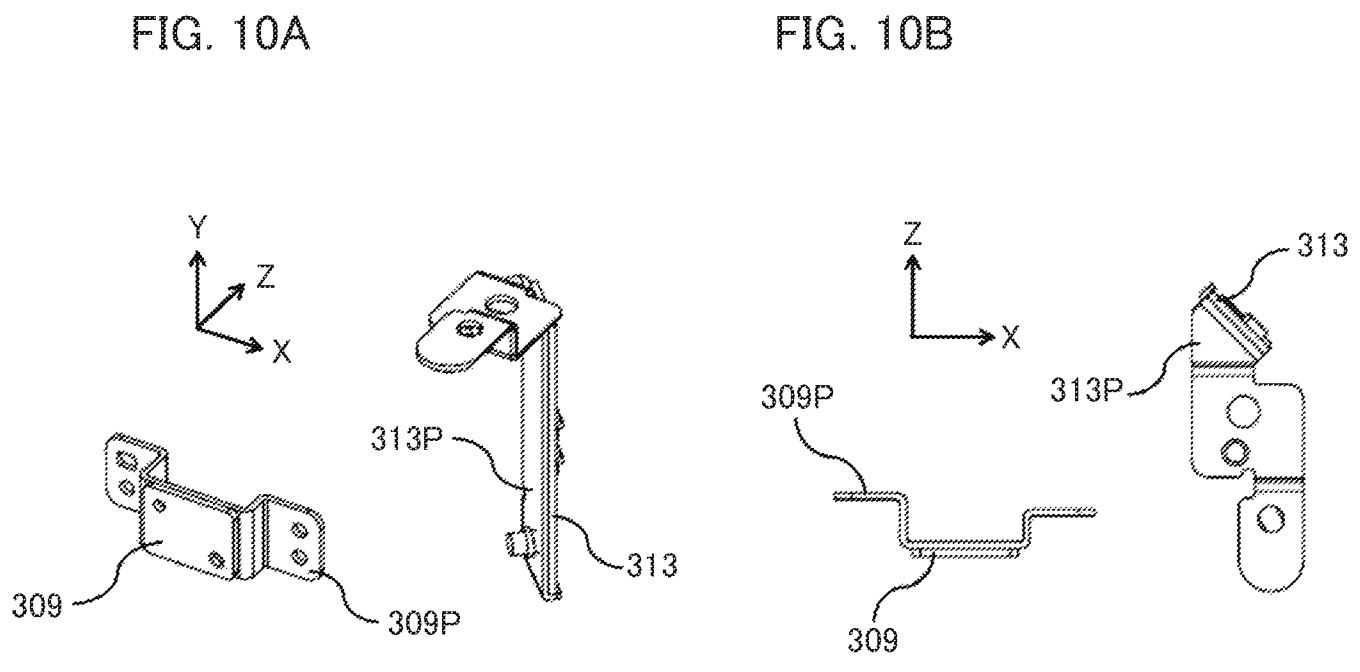

FIG. 10A is a perspective view showing positional relationships of the millimeter-wave radar device 309, a holding sheet metal 309P of the millimeter-wave radar device 309, the radio antenna module 313, and a holding sheet metal 313P of the radio antenna module 313. FIG. 10B is a view viewed from above.

The holding sheet metals 309P and 313P are fixed to parts (not shown) to determine positions of the millimeter-wave radar device 309 and the radio antenna module 313 in the imaging device 100. At this time, the holding sheet metals 309P and 313P hold each device so that they are arranged between the millimeter-wave radar device 309 and the radio antenna module 313.

By taking such a configuration, it is possible to reduce the radio wave interference of the radio antenna module 313 with respect to the radio waves of the millimeter-wave radar device 309 and it is possible to reduce the risk of occurrence of poor detection. Here, both holding sheet metals 309P and 313P may be arranged between the millimeter-wave radar device 309 and the radio antenna module 313 or only one thereof may be arranged therebetween.

While the present disclosure has been described above in detail on the basis of preferred embodiments, the present disclosure is not limited to the above-described embodiments, various modifications are possible on the basis of the spirit of the present disclosure, and they are not excluded from the scope of the present disclosure. Furthermore, the present embodiment includes the following combinations.

In addition, as a part or the whole of the control according to the embodiments, a computer program realizing the function of the embodiments described above may be supplied to the information processing apparatus or the like through a network or various storage media. Then, a computer (or a CPU, an MPU, or the like) of the information processing apparatus or the like may be configured to read and execute the program. In such a case, the program and the storage medium storing the program configure the present disclosure.

The present disclosure can also be implemented in a process in which a program for implementing one or more functions according to the above-described embodiments is supplied to a system or an apparatus via a network or a storage medium and one or more processors in a computer of the system or the apparatus read and execute the program. Moreover, the present disclosure can be also implemented with a circuit (e.g., an application specific integrated circuit (ASIC)) that implements one or more functions.

The present disclosure includes embodiments realized using, for example, at least one processor or circuit configured to function of the embodiments explained above. For example, a plurality of processors may be used for distribution processing to perform functions of the embodiments explained above.

What is claimed is:

1. An electronic apparatus comprising:
a main body;
a movable member movable with respect to the main body;
an eyepiece portion;
at least one memory storing instructions; and
a detection unit configured to simultaneously detect an attitude of the movable member and eye contact with the eyepiece portion by radiating radio waves,
wherein the detection unit is arranged at a position and an attitude based on an orientation angle of the detection unit, arrangement information of the movable member, information of a region of the movable member interfering with the radio waves for detecting the attitude, and information about an eye point related to the eyepiece portion.

2. The electronic apparatus according to claim 1, wherein the movable member includes a display unit configured to display information.

3. The electronic apparatus according to claim 1, wherein the movable member is openable and closeable with respect to the main body, and
wherein the detection unit is configured to detect an open or closed state of the movable member.

4. The electronic apparatus according to claim 1, wherein $\theta$, Lx and Lz are determined on the basis of Tx, Tz, TL, E, and G,
wherein the orientation angle of the detection unit is denoted by $\alpha$, an angle formed by a central axis of the detection unit in an orientation direction and an optical axis is denoted by $\theta$, an X-coordinate of the detection unit is denoted by Lx, a Z-coordinate of the detection unit is denoted by Lz, an X-coordinate of the movable member is denoted by Tx, a Z-coordinate of the movable member is denoted by Tz, a size of the region of the movable member interfering with the radio waves is denoted by TL, an eye point value is denoted by E, and a value of reference coordinates of the eye point is denoted by G.

5. The electronic apparatus according to claim 4, wherein $\theta$, Lx, and Lz are determined so that the following equations are satisfied.

$$TL = Tz - Lz - (Tx + Lx)\tan\left(90 - \frac{1}{2}\alpha - \theta\right)$$

14

-continued $$E = Lx \tan\left(\theta - \frac{1}{2}\alpha\right) - G + Lz$$

6. The electronic apparatus according to claim 1, wherein the detection unit is a radar device.

7. The electronic apparatus according to claim 1, further comprising another device different from the detection unit and provided in the electronic apparatus,
wherein, in the detection unit, at least one of a metallic plate configured to fix the detection unit to the electronic apparatus or a metallic plate configured to fix the another device to the electronic apparatus is arranged between the detection unit and the another device.

8. The electronic apparatus according to claim 1, wherein a part configured to block radio waves is arranged between the detection unit and a coil provided in the electronic apparatus.

9. The electronic apparatus according to claim 1,
wherein the movable unit includes a display member openable and closeable with respect to the main body of the electronic apparatus and configured to display information, and
wherein the detection unit is a radar device provided at a position where an open or closed state of the display member and the eye contact with the eyepiece portion are simultaneously detectable by radiating radio waves.

10. The electronic apparatus according to claim 9, wherein if the display member, the eyepiece portion, and the radar device are projected onto an XZ plane, $\theta$, Lx, and Lz are determined on the basis of Tx, Tz, TL, E, and G,
wherein the orientation angle of the radar device is denoted by $\alpha$, an angle formed by a central axis of the radar device in an orientation direction and an optical axis is denoted by $\theta$, an X-coordinate position of the radar device in a direction orthogonal to an optical axis direction is denoted by Lx, a Z-coordinate position of the optical axis direction is denoted by Lz, an X-coordinate position of the display member is denoted by Tx, a Z-coordinate position of the display member is denoted by Tz, a size of the region of the display member interfering with the radio waves in an open state is denoted by TL, an eye point value is denoted by E, and a value of reference coordinates of the eye point is denoted by G.

11. An imaging device comprising:
an imaging unit configured to image a subject; and
an electronic apparatus comprising:
a main body;
a movable member movable with respect to the main body;
an eyepiece portion;
at least one memory storing instructions; and
a detection unit configured to simultaneously detect an attitude of the movable member and eye contact with the eyepiece portion by radiating radio waves,
wherein the detection unit is arranged at a position and an attitude based on an orientation angle of the detection unit, arrangement information of the movable member, information of a region of the movable member interfering with the radio waves for detecting the attitude, and information about an eye point related to the eyepiece portion.

12. The imaging device according to claim 11, wherein Ly and o are set to values at which a part of the imaging unit is not included in a range of an orientation angle $\beta$ on a YZ plane,

15

16 wherein the orientation angle of the detection unit on the YZ plane is denoted by β, an angle formed by a central axis of the detection unit in an orientation direction and an optical axis is denoted by φ, a Y-coordinate of the detection unit is denoted by Ly, and a part of the imaging unit is arranged in a range of an orientation angle α of the detection unit determined according to the following equations on an XZ plane.

$$TL = Tz - Lz - (Tx + Lx)\tan\left(90 - \frac{1}{2}\alpha - \theta\right)$$

$$E = Lx \tan\left(\theta - \frac{1}{2}\alpha\right) - G + Lz$$

\*   \*   \*   \*   \*